UNITED STATES PATENT OFFICE 2,104,693

WELDROD

Anthony G. de Golyer, New York, N. Y., assignor to Vulcan Alloy Corporation, a corporation of Delaware No Drawing. Application August 17, 1936, Serial No. 96,463

1 Claim. (Cl. 219—8)

This invention relates to a new alloy steel and relates particularly to an alloy steel containing manganese and boron, as well as certain other elements, in the form of weld rod for the production of welded surfaces or sections characterized by relatively high degree of hardness, resistance to abrasion and resistance to deformation under impact.

In many industrial operations it is desirable to apply a facing or inlay of hard wear resistant metal to parts of machinery or other equipment exposed to excessive abrasion or impact. Various alloy and materials have been proposed for this purpose. All of such heretofore suggested compositions contain high percentages of alloy elements, together with at least 1% or more carbon. In general, weld metal deposited with such compositions may have high hardness, i. e. approximately 400 to 500 Brinell hardness numbers but all of such deposits are relatively brittle and consequently are not suitable for use on surfaces exposed to impact or shock.

The object of the present invention is to provide an alloy which may be readily deposited by fusion welding, and which produces weld metal having relatively high strength, high resistance to deformation under impact and relatively high hardness.

In have found that an alloy composed of manganese 1% to 6%, boron 0.50% to 2.25%, carbon 0.10% to 0.60% and the remainder principally iron, possesses high hardness, high strength and is extremely resistant to deformation under impact when deposited by means of welding, such as the oxyacetylene or electric arc methods. Metal so deposited has a hardness of from 375 to 500 Brinell, depending, in part, upon the composition of the base metal and the ratio of dilution. Weld deposits of the alloy which have been subjected to an appreciable amount of cold work or impact usually show an increase in hardness of from 50 to 150 Brinell numbers.

A distinct advantage of the present alloy is that it may be readily welded on steel of any carbon content, 14% manganese steel, rail steel, and virtually all types of alloy steels. The combination of physical properties and characteristics possessed by this alloy render it particularly valuable for facing new or worn rail ends, new or worn railroad track equipment, such as frogs, crossovers, switch points, etc.; for repairing or refacing manganese steel and other alloy steels, and for facing wearing surfaces on carbon steels.

The essential components of my alloy are manganese, boron, carbon, silicon and iron. The principal constituent of the alloy is iron. The manganese content should be between 1% and 6%, the boron content between 0.50% and 2.25%, the carbon should not exceed approximately 0.60%, and the silicon content should not exceed approximately 0.70%; the balance being substantially iron. It will be understood that the alloy will usually contain minor amounts of phosphorus, sulphur and other impurities incidental to manufacture; the amounts of such impurities present should be within the maximum limits ordinarily prescribed for alloy steels.

As specific examples, alloys within the scope of the present invention which I have found to be particularly suitable for facing by welding of new or worn equipment are the following: manganese 1.50%, boron 1%, carbon 0.35%, silicon 0.20% and the balance substantially iron; manganese 3.10%, boron 1.15%, carbon 0.40%, silicon 0.30%, and the balance substantially iron.

I claim:

A weld rod comprising a metallic composition containing manganese 1% to 6%, boron 0.50% to 2.25%, carbon 0.10% to 0.60%, silicon not exceeding a maximum of 0.70%, and the remainder substantially iron.

ANTHONY G. DE GOLYER.